United States Patent [19]

Bisbing et al.

[11] 4,258,596
[45] Mar. 31, 1981

[54] TAMPER-RESISTANT FASTENER

[75] Inventors: Robert H. Bisbing, Springfield; William R. Frame, Brookhaven, both of Pa.

[73] Assignee: Southco, Inc., Concordville, Pa.

[21] Appl. No.: 32,212

[22] Filed: Apr. 23, 1979

Related U.S. Application Data

[63] Continuation of Ser. No. 870,372, Jan. 18, 1978, abandoned, which is a continuation-in-part of Ser. No. 816,896, Jul. 18, 1977, abandoned.

[51] Int. Cl.³ .................. F16B 23/00; B25B 13/48
[52] U.S. Cl. .................. 81/436; 411/403; 411/911
[58] Field of Search .................. 85/4 S, 9 R, 9 E; 145/50 A, 50 R; 70/403; 81/71, 121 R

[56]  References Cited

U.S. PATENT DOCUMENTS

| 1,298,398 | 3/1919 | Purple | 85/9 E |
|---|---|---|---|
| 2,124,652 | 7/1938 | Curle et al. | 85/45 UX |
| 2,338,023 | 12/1943 | Bugg | 85/45 |
| 2,397,216 | 3/1946 | Stellin | 85/45 |
| 2,770,998 | 11/1956 | Schwartz | 85/45 |
| 3,369,441 | 2/1968 | Kosar | 85/45 |
| 3,512,380 | 5/1970 | Winter | 70/403 X |
| 3,888,144 | 6/1975 | Parsons | 85/45 X |
| 4,018,111 | 4/1977 | Goldhaber | 85/45 X |

FOREIGN PATENT DOCUMENTS 11255930  9/1968  United Kingdom .................. 85/45

Primary Examiner—Ramon S. Britts
Attorney, Agent, or Firm—Paul & Paul

[57]  ABSTRACT

A tamper-resistant fastener is disclosed, having a head which tends to prevent the removal of the fastener by conventional tools. The fastener head is provided with three sockets, at least one of which is eccentrically disposed with respect to the other two. The fastener may be attached and removed only with the application of a special driving tool having a male portion adapted for matable engagement with the fastener head. The eccentricity of at least one of the sockets permits the turning of the fastener upon the application of torque by the driving tool. The three-socket arrangement substantially eliminates the tendency of the driving tool to tilt when torque is applied.

13 Claims, 6 Drawing Figures

TAMPER-RESISTANT FASTENER

RELATION TO PRIOR APPLICATION

This is a continuation application of application Ser. No. 870,372, filed Jan. 18, 1978, now abandoned which in turn was a continuation-in-part of an application for U.S. patent entitled TAMPER-RESISTANT HEAD FOR FASTENERS, Ser. No 816,896, filed July 18, 1977, now abandoned.

BACKGROUND OF THE INVENTION

This invention relates to tamper-resistant fasteners. Fasteners which resist removal by conventional screwdrivers and other means are known to the art. One method of inhibiting the unauthorized removal of fasteners has been to construct a fastener head having two sockets, one of which is eccentrically disposed relative to the other. The fastener can then be turned only upon the application of a special driving tool, which matches the shape of the sockets in the fastener head. An example of this type of fastener is disclosed in U.S. Pat. No. 2,338,023, to Bugg, in which two such sockets are embedded in a fastener head. The eccentricity of one socket permits the turning of the fastener by a driving tool having projections matching the sockets of the fastener. Since the sockets are typically of circular shape, they resist efforts to remove the fasteners by ordinary means.

Fasteners having sockets similar to those described above, known in the art as "specialty head" fasteners, present problems in operation. When torque is applied to a conventional fastener head having two sockets, there is a marked tendency for the driving tool to tilt considerably as torque is being applied. The tilting effect interferes greatly with the installation and removal of such fasteners, since the tilting diverts much energy from the user, as attempts are made to keep the tool in a straight position.

Conventional tamper-resistant fasteners of the two-socket variety also do not provide an ideal fit between fastener head and driving tool. With only two sockets, the connection between head and tool is not particularly strong, and the tool must be held very firmly against the fastener head while torque is applied.

Other types of tamper-resistant fasteners, which do not create tilting problems, include those containing a one-way head, and those having a breakaway head. The former type can be driven in only one direction. The latter type is driven by conventional tools, but can be used only once, because part of the head breaks away from the fastener after use. The specialty-head fastener is the only one of the three types that can be screwed and unscrewed many times.

SUMMARY OF THE INVENTION

The problems described above are substantially solved by the present invention. This invention provides a tamper-resistant fastener, having a head with three sockets therein. In the preferred embodiment, the sockets are of circular shape, and having progressively smaller diameters, with the smallest diametered socket being the deepest socket in the fastener head. At least one of the sockets has an axis which is eccentric relative to the center axis of the largest socket. In the preferred embodiment, the eccentric socket is the middle socket. The sidewall of the fastener head is sloped, to impede further the unauthorized removal of the fastener. The head of the fastener is attached to a conventional shank which may be threaded and used in a normal manner. In an alternative embodiment, the largest socket is defined in part by a freely rotating cup-collar which further discourages tampering.

The invention further comprises a special tool adapted for driving a tamper-resistant fastener. The tool resembles a screwdriver, but unlike a screwdriver, the end of the tool contains projections whose shapes exactly match the sockets in the fastener head. The tool thus mates firmly with the fastener head, and when torque is applied to the tool, the eccentricity of one of the sockets causes the head to turn in the desired direction. The use of the third socket substantially eliminates the tendency of the driving tool to tilt while torque is applied.

A primary object of the present invention is to provide a tamper-resistant fastener which cannot be operated with conventional tools.

A further object of this invention is to provide a tamper-resistant fastener which can be used more than once.

A further object of this invention is to provide a tamper-resistant fastener that does not result in tilting of the driving tool when torque is applied.

A further object of this invention is to provide a tamper-resistant fastener head having an appearance which tends to discourage tampering.

A further object of this invention is to provide a three-socketed tamper-resistant fastener head adapted to be used on various objects.

A further object of this invention is to provide a tamper-resistant fastener having a free-spinning cup-collar which tends to resist removal of the fastener by conventional means.

A further object of this invention is to provide a tamper-resistant fastener, and a tool for driving the fastener, wherein said tool mates firmly with the head of the fastener.

Other objects and advantages of this invention will be apparent to those skilled in the art, from a reading of the following Brief Description of the Drawings, the Detailed Description of the Invention, and the appended claims.

DETAILED DESCRIPTION OF THE INVENTION

Figure 2:
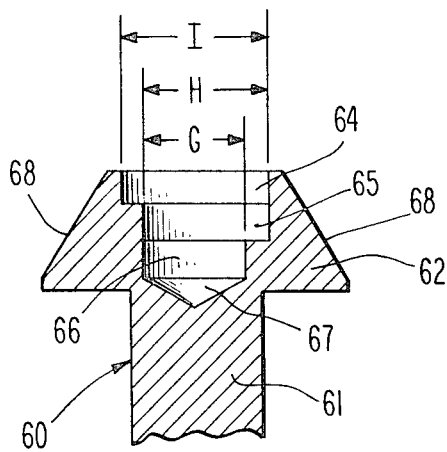
FIG. 2 is a fragmentary cross-sectional view of a fastener head, taken along the lines 2—2 of FIG. 1.

In FIG. 2 there is shown, in fragmentary cross-section, a fastener head made in accordance with this invention. Tamper-resistant fastener 60 comprises a shank 61 and a head portion 62. Shank 61 may be threaded according to the needs of the user. Head 62 defines the three sockets 64, 65, and 66. The first socket 64 is nearest the top of head 62, and has diameter indicated as I in the figure. Diameter I is the largest diameter of the three diameters shown. Second socket 65 is located immediately below first socket 64, and has diameter H. Third socket 66 is located immediately below second socket 65, and has diameter G. Third socket 66 includes an additional downward-sloping extension 67, which is part of third socket 66. In the embodiment shown in FIG. 2, second socket 65 is eccentric relative to first socket 64 and third socket 66. Indeed, first socket 64 and third socket 66 are concentric.

Figure 1:
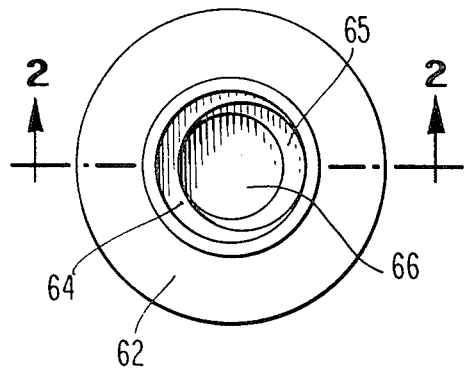
FIG. 1 is a top view of a three-socket tamper-resistant fastener which is the subject of this invention.

The three-socket arrangement of the present invention is further illustrated in FIG. 1, which shows a top view of a tamper-resistant fastener. In this figure, head 62 is seen, followed by first socket 64, second socket 65, and third socket 66. The eccentric nature of second socket 65 is plainly visible in FIG. 1.

Figure 3:
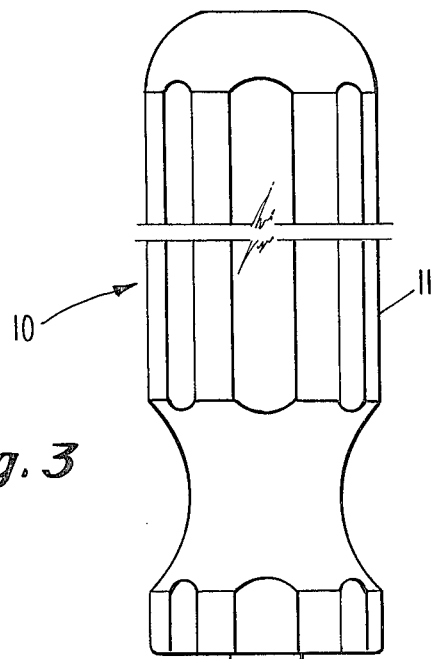
FIG. 3 is a fragmentary elevational view of a driving tool which is used to turn the fastener head disclosed in this invention.

The fastener illustrated in FIG. 1 and FIG. 2 is turned by the use of a driving tool which is illustrated in FIG. 3. Driving tool 10 comprises a handle 11, and a shank portion 12. Extending longitudinally from shank 12 is a first protrusion 13 and a second protrusion 14. Protrusions 13 and 14, together with shank 12 are adapted for matable engagement with a tamper-resistant fastener head, such as the one illustrated in FIG. 2. Thus, in the driving tool 10 shown in FIG. 3, protrusion 13 is eccentric relative to shank 12 and protrusion 14, because protrusion 13 is designed to mate with second socket 65, as shown in FIG. 2.

When the driving tool 10 is inserted into the fastener head 62, the application of torque to the tool 10 will cause a torque to be applied to the head 62 by virtue of the eccentric position of at least one of the sockets. Head 62 can thus be made to turn in either direction, as desired. The three-socket configuration substantially prevents the tendency of the driving tool 10 to tilt while torque is applied. This tilting effect, which frequently occurs when two-socket fasteners are used, is substantially eliminated, once the driving tool 10 is inserted all the way into fastener head 62. The presence of three sockets creates a sturdy mating engagement between tool 10 and head 62, and overcomes any extraneous torques which are generated by two-socketed fasteners. As can be seen from FIG. 2 and FIG. 3, it is the eccentric disposition of at least one of the sockets which permits torque to be transmitted to the fastener head 62, in accordance with the principles of this invention.

The appearance of fastener 60 tends to deter attempts at tampering, because head 62 contains no receptacle to accommodate a conventional screwdriver. Also the sloping sidewalls 68 of fastener head 62 tend to deter unauthorized removal by the use of conventional gripping means. A pair of pliers, for example, would tend to slide off head 62 before removal could be accomplished.

Figure 4:
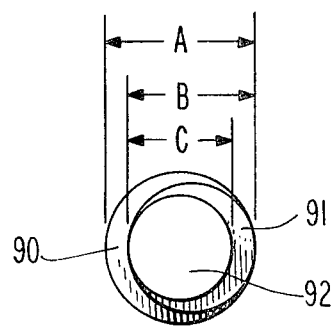
FIG. 4 is another top view of a tamper-resistant fastener, illustrating the specific relationships among socket diameters which are present in the preferred embodiment.

FIG. 4 shows more precisely the dimensions involved in the preferred embodiment. The dimensions taught in FIG. 4 can be readily applied to the fastener shown in FIG. 1 and FIG. 2, which are shown in their present form for the sake of clarity of illustration. In FIG. 4, there is shown a top view of a fastener head, wherein first, second, and third sockets are indicated as 90, 91, and 92 respectively. The respective diameters of sockets 90, 91, and 92 are indicated as A, B, and C, respectively. In the preferred embodiment, the diameter B of second socket 91 is equal to five-sixths of the diameter A of first socket 90. The diameter C of third socket 92 is equal to two-thirds of the diameter A of first socket 90. Finally, the eccentricity of second socket 91, that is, the linear distance between the axis of second socket 91 and the common axis of first socket 90 and third socket 92, is equal to one-twelfth of diameter A, the diameter of first socket 90. Note that the eccentric dimension of second socket 91 is equal to one-fourth of the difference between first diameter A and the third diameter C, and that second diameter B is equal to the average of first diameter A and third diameter C. It has been found that the dimensions shown in FIG. 4 are optimum dimensions, both for ease of manufacture and for providing superior operating characteristics.

Figure 5:
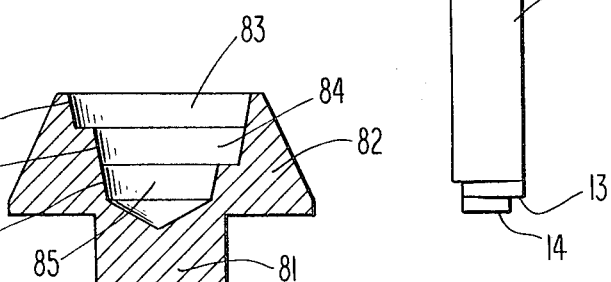
FIG. 5 is a fragmentary cross-sectional view of a modified form of the tamper-resistant fastener head disclosed herein.

Another embodiment of the present invention is shown in FIG. 5, wherein the walls of one or more of the three sockets slope upward. In FIG. 5, there is shown a shank portion 81, connected to a fastener head 82, and first, second and third sockets designated respectively as 83, 84, and 85. In the embodiment of FIG. 5, each of the three sockets 83, 84, and 85 have sloping walls, 86, 87, and 88 respectively, said walls diverging upward as shown in the figure. Any or all of the walls of any of the sockets may be sloped as desired.

Figure 6:
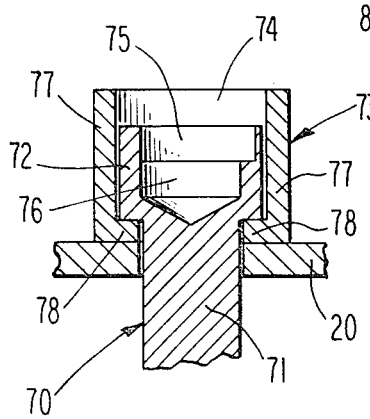
FIG. 6 is a fragmentary cross-sectional view of an alternative embodiment of the tamper-resistant fastener disclosed in the present invention.

Another embodiment of the present invention is illustrated in FIG. 6. Tamper-resistant fastener 70 is shown, in fragmentary cross-section, attached through a panel 20. Fastener 70 comprises a shank portion 71 and a head 72. But in this embodiment, first socket 74 is defined by a rotatable cup-collar 73. Collar 73 comprises vertical walls 77 connected to an annular base portion 78. The first socket 74 is therefore defined by the vertical walls 77 of collar 73, and the top of fastener head 72. Second socket 75 and third socket 76 are defined entirely by fastener head 72, as in the previous embodiments. All three sockets function in a similar manner to that described earlier. In this embodiment, however, collar 73 is free to turn about its axis, which is the same axis as the center axis of shank 71. If an unauthorized attempt at removal is made by gripping or turning collar 73, fastener 70 is not affected, as collar 73, not being an integral part of head 72, merely turns without causing the removal of fastener 70.

It should also be noted that the three-socket arrangement disclosed in the present invention has the added advantage of providing a snug fit between the driving tool, such as the tool shown in FIG. 3, and a fastener head, such as that shown in the other figures. When driving tool 10 is inserted into a fastener head such as 62 in FIG. 2, the driving tool 10 tends to wedge firmly against fastener head 62 when torque is applied, and tends to remain inserted in the fastener head 2, even though no more torque is being applied. In applications where a fastener head 62 is inserted such that head 62 is pointing downward, this wedging effect means that driving tool 10 can be temporarily suspended from fastener head 62 without the use of any extra holding device.

In all of the embodiments described above, the head of the fastener is preferably made of hardened steel, so as to resist attempts to cut into it, so as to form engagement means for a conventional screwdriver.

It is evident that the objects of the present invention have been amply fulfilled by the three-socket fastener head disclosed herein. As suggested above, other modifications of the fastener disclosed in this invention are possible, all within the spirit and scope of this invention, and this disclosure is not intended to be limited to the specific embodiments described above.

What is claimed is:

1. A tamper-resistant torque-responsive fastener comprising a shank and a head;
    a. said head having a peripheral sidewall adapted to prevent the application of torque to said head which will be effective on the shank;
    b. said head having first, second and third sockets each of circular cross section, said sockets having respectively first, second and third diameters each different from the other;
    c. said first diameter being larger than said second diameter, said second diameter being larger than said third diameter;
    d. said second socket extending below the bottom of said first socket, said third socket extending below the bottom of said second socket;
    e. said first and third sockets each having a center axis which is concentric relative to the center axis of the fastener head;
    f. said second socket having a center axis which is eccentric relative to the center axis of said fastener head.

2. The fastener of claim 1 wherein the eccentric dimension of said second socket is such that the second diameter is totally within said first diameter.

3. The fastener of claim 2, wherein the eccentric dimension of said second socket is equal to one-fourth of the difference between said first and said third diameters.

4. The fastener of claim 2, wherein said second diameter is equal to the average of said first diameter and said third diameter.

5. The fastener of claim 2, wherein said second diameter is equal to five-sixths of said first diameter.

6. The fastener of claim 2, wherein said third diameter is equal to two-thirds of said first diameter.

7. The fastener of claim 2 wherein eccentric dimension of said second socket is equal to one-twelfth of said first diameter.

8. The fastener of claim 2, wherein said peripheral sidewall of said head is an inclined circumferential surface, the angle of inclination being sufficiently great to inhibit gripping by a conventional tool.

9. The fastener of claim 2, wherein said head is formed of hardened steel.

10. The fastener of claim 2, wherein said first socket is formed by a rotatable cup-collar which embraces the periphery and undersurface of the head portion which is integral with the shank, said cup-collar having an axial opening in its base through which the shank projects, the sidewall of said cup-collar projecting above the upper surface of the head portion to form said first socket.

11. The fastener of claim 2, wherein at least one of said sockets has upwardly sloping walls.

12. A drive tool for applying torque to a tamper-resistant fastener the head of which has three sockets of circular cross section, namely, an upper socket, a lower socket and an intermediate socket, the center axis of said upper and lower sockets each being concentric with the center axis of the fastener head, the center axis of said intermediate socket being eccentric with the center axis of the fastener head, said tool comprising a handle, a shank connected to said handle, a first longitudinal projection extending from the tip of said shank and having a diameter less than that of said shank, a second longitudinal projection extending from said first projection and having a diameter less than that of said first projection, the center axis of said first projection being eccentric relative to the center axis of the tool shank, the center axis of said second projection being concentric relative to the center axis of the tool shank, the tip of said tool shank and the first and second projection being of such size and shape as to be inserted into matable engagement with the three sockets of said fastener.

13. In combination:
    A. a tamper-resistant torque-responsive fastener comprising a shank and a head;
        a. said head having a peripheral sidewall adapted to prevent the application of torque to said head which will be effective on the shank;
        b. said head having first, second and third sockets each of circular cross section, said sockets having respectively first, second and third diameters each different from the other;
        c. said first diameter being larger than said second diameter, said second diameter being larger than said third diameter;
        d. said second socket extending below the bottom of said first socket, said third socket extending below the bottom of said second socket;
        e. said first and third sockets each having a center axis which is concentric relative to the center axis of the fastener head;
        f. said second socket having a center axis which is eccentric relative to the center axis of said fastener head; and
    B. a drive tool for applying torque to said tamper-resistant torque-responsive fastener, said tool comprising:
        g. a handle,
        h. a shank connected to said handle;
        i. a first longitudinal projection extending from the tip of said shank and having a diameter less than that of said shank;
        j. a second longitudinal projection extending from said first projection and having a diameter less than that of said first projection;
        k. the center axis of said first projection being eccentric relative to the center axis of the tool shank;
        l. the center axis of said second projection being concentric relative to the center axis of the tool shank;
        m. the tip of said tool shank and the first and second projection being of such size and shape as to be inserted into matable engagement with the three sockets of said fastener.

* * * * *